June 2, 1936.  C. C. MARTIN  2,042,674
WINCH
Filed Sept. 12, 1935   3 Sheets-Sheet 3

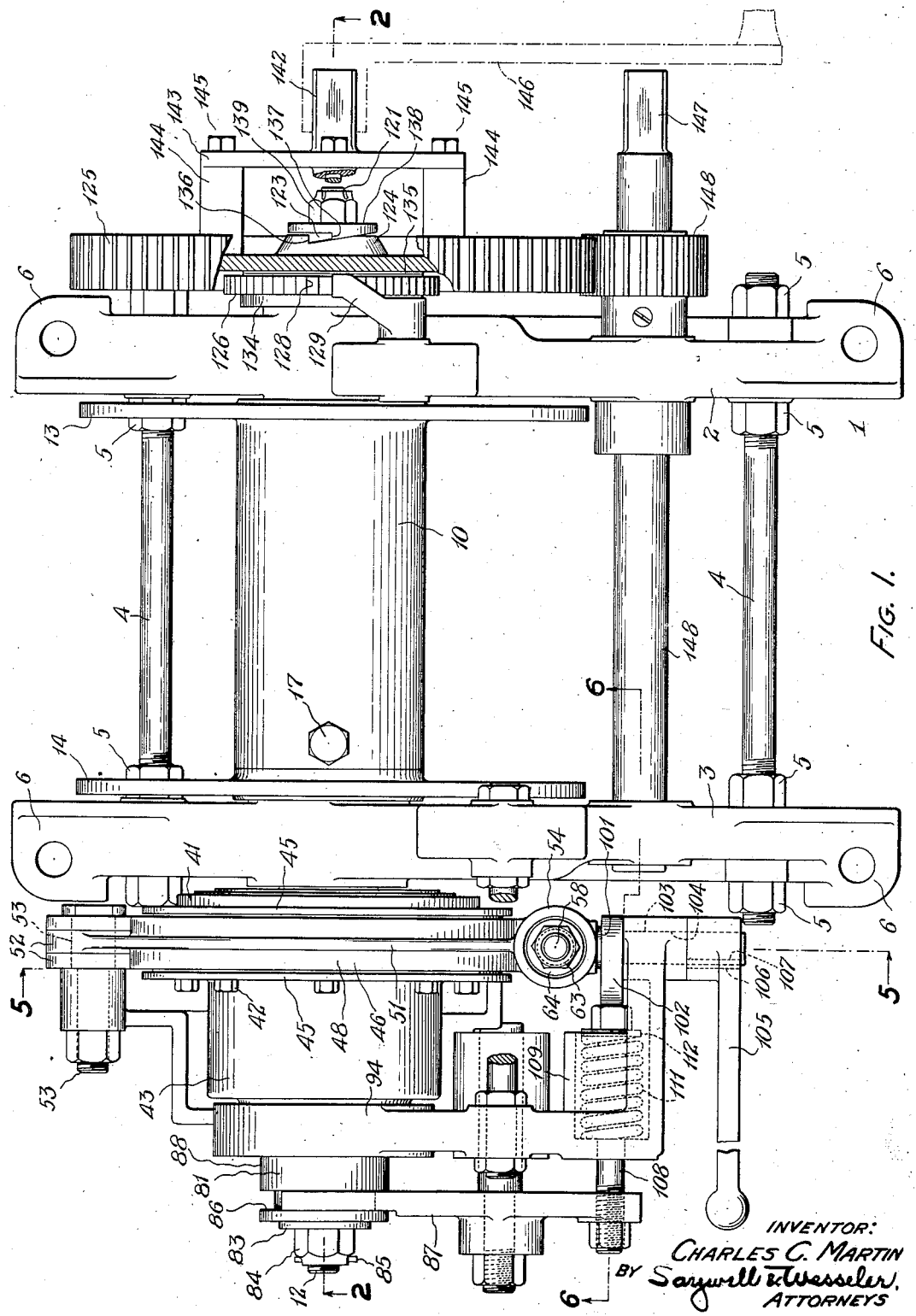

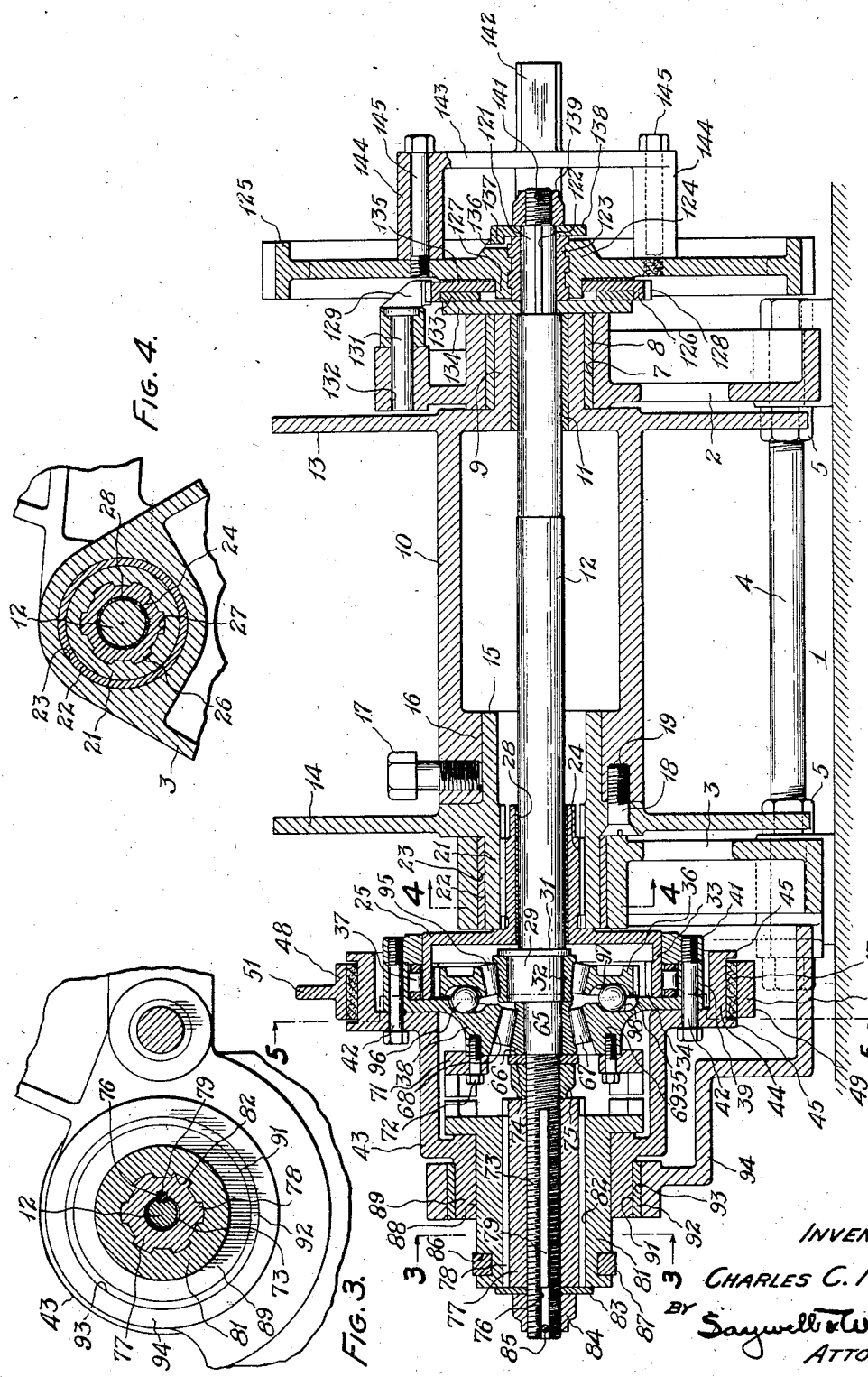

INVENTOR:
CHARLES C. MARTIN
BY Saywell & Wesseler,
ATTORNEYS

Patented June 2, 1936

2,042,674

UNITED STATES PATENT OFFICE 2,042,674

WINCH

Charles C. Martin, East Cleveland, Ohio, assignor to David Round & Son, Garfield Heights, Ohio Application September 12, 1935, Serial No. 40,274

6 Claims. (Cl. 254—186)

This invention, as indicated, relates to a winch. More particularly it comprises a winch adapted to a wide variety of uses and adapted to be operated at various speeds and to be driven by motor or by hand. It is of particular utility in connection with the handling of motor blocks in manufacturing plants for automobiles and the like, being adapted for a nicety of control superior to that found in other appliances for this purpose.

The apparatus as shown includes a planetary type of hoist, that illustrated comprising the mechanism shown in Johson Patents Nos. 1,833,648 and 1,876,954.

The principal object of the present invention is to provide an improved type of winch mechanism wherein a gear ratio affording a high degree of mechanical advantage may be supplied in very compact form.

Another object of the invention is to provide a mechanism wherein silent operation is attained through the use of internal gears having a large number of teeth continuously in engagement.

Another object of the invention is to provide for a compact winch mechanism wherein planetary action may be utilized or wherein the drive may be through the shaft directly or through a train of gears as may be desired.

Another object of the invention is to provide a mechanism for controlling the planetary action of the apparatus through the action of a clutch and clamping band or brake member.

Another object of the invention is to provide a hand drive for the apparatus providing a further mechanical advantage for the operator both when driving through the shaft directly or through the planetary action.

Another object of the invention is to provide suitable braking means for the mechanism both when operating in a direct ratio or through the planetary action.

Other and further objects of the invention will appear in the course of the following description.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but several of various forms in which the principle of the invention may be used.

In said annexed drawings:

Figure 1 is a top plan view of a winch embodying the principles of the invention;

Figure 2 is a vertical axial sectional view, taken along the line 2—2 shown in Figures 1 and 5, looking in the direction of the arrows;

Figure 3 is an enlarged detail view, partly in section, taken along the line 3—3 shown in Figure 2, looking in the direction of the arrows;

Figure 4 is an enlarged fragmentary detail view, partly in section, taken along the line 4—4 shown in Figure 2, looking in the direction of the arrows;

Figure 5:
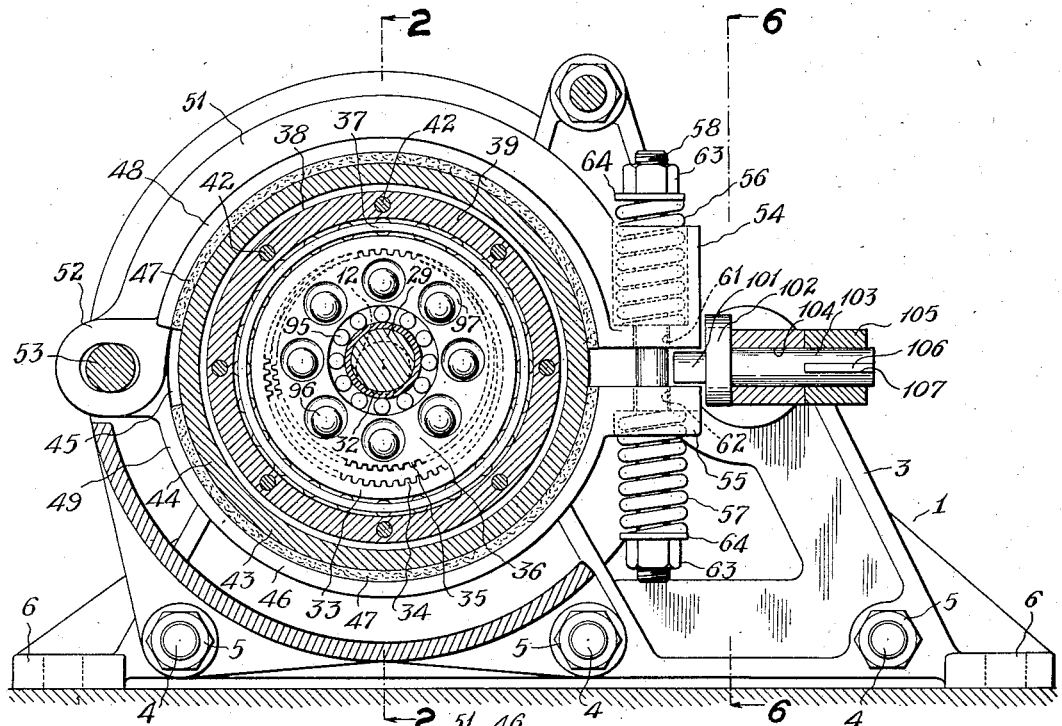
Figure 6:
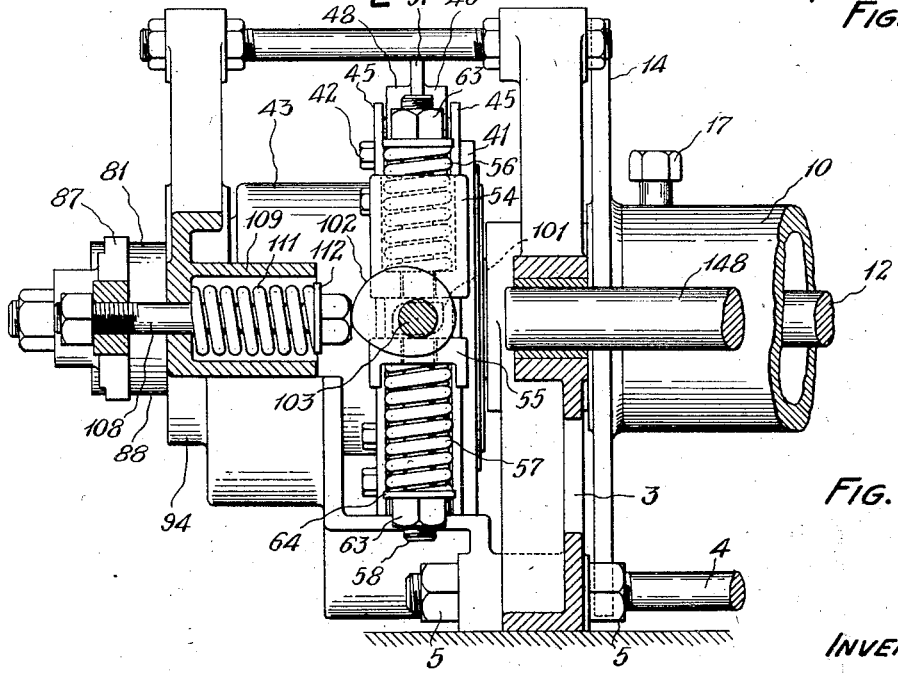

Figure 5 is a view partly in section, taken along the line 5—5 shown in Figures 1 and 2, looking in the direction of the arrows; and Figure 6 is a view, partly in section, taken along the line 6—6 shown in Figures 1 and 5, looking in the direction of the arrows, and showing the combined clutch and planetary gear control mechanism.

As is clearly shown in the drawings, the apparatus includes a support 1 shown in the form of end frame members 2, 3, secured to each other by a plurality of spacing and connecting bars 4 shown as having threaded ends with pairs of nuts 5 engaged on opposite sides of the frame members permitting adjustment of the spacing of such members. Apertured lugs 6 are provided at the ends of the frame members to permit the same to be bolted to a platform or other point of support. The frame members provide bearings for the rotating parts of the apparatus at the respective ends, as well as points of support for various controlling members.

The end frame member 2 adjacent the drive end of the apparatus is formed with an aperture 7 receiving the bushing 8 in which the projecting end bearing member 9 of the drum 10 engages, said bearing member having a bushing 11 through which one end of the drive shaft 12 extends. The drum comprises the cylindrical central portion and as shown is provided with an integral end flange 13 adjacent the driving end of the apparatus and with a removable end flange 14 adjacent the opposite end. The removable end flange of the drum provides for simplicity of manufacture as well as ease of assembly of the apparatus. It is engaged with the cylindrical central portion of the drum by means of an inwardly extending collar 15 which slidingly engages within an axial opening in an enlarged end portion 16 of the central drum member, held in position by means of one or more bolts 18 engaged in suitably threaded recesses 19 in the enlarged central portion of the drum. When a chain end is to be attached to a drum, a stud bolt 17 to hold the same may be engaged in a screw-threaded socket in the enlarged central portion of the drum. When the end of a cable is to be secured to the drum, the stud bolt is replaced by a collar with a tapered central opening within which the cable end is locked in conventional manner.

The removable end flange 14 of the drum is formed with a cylindrical bearing portion 21 in alinement with and substantially of the size of the collar 15, such bearing portion engaging a bushing 22 secured within an aperture 23 in the end frame member 3.

The projecting bearing portion 21 of the drum is secured to the outer portion of the hub 24 of the internally toothed shell 25 of the planetary gear mechanism, presently to be described, the engagement as shown in Figure 4 of the drawings being by a series of splines 26 and grooves 27 preferably tapered so as to provide a press fit. The drum is thus in effect rigidly secured to the shell 25 of the planetary gear mechanism and is free to rotate therewith in the bearings heretofore described.

The hub 24 of the shell 25 is provided with a bushing 28 through which the main shaft 12 passes, said main shaft being provided with an eccentric 29 having a flange 31 against which a tapered roller bearing race member 32 engaged over the eccentric bears with its end portion.

The eccentric and its bearing member is housed within the shell 25 which shell is open at one side and has a central body portion 33 in the form of a cylindrical extension which is provided with a series of teeth on its under side forming an internal gear 34. The internal gear is engaged by the circumferential teeth 35 on a drive gear 36 supported on the roller bearings 95 and adapted to be actuated by the movement of the eccentric 29 on the crank shaft, as will be presently explained.

Immediately above the internal teeth on the extension portion of the shell a series of rollers 37 are provided which rotatably support a plate 38 in the form of a flanged shell having an extension portion 39 telescopically engaging over the extension portion 33 of the shell 25 with the rollers 37 intermediate the same. A retaining ring 41 serves to hold the rollers in operative position and fastening members in the form of bolts 42 serve to secure an outer casing member 43 to the shell 38 and at the same time hold the retaining ring 41 in position. The casing member 43 is formed with an extension 44 substantially in the plane of the eccentric member on the drive shaft which is provided on its outer periphery with a pair of upstanding flanges 45 to receive a clamping band or brake member 46 preferably having an anti-friction lining 47 to engage the adjacent portion of the casing.

The brake member may take various forms, but as shown more particularly in Figure 5, comprises a pair of upper and lower substantially semi-circular members 48, 49, the upper member preferably having a reinforcing rib 51 extending outwardly therefrom. The brake members are formed with enlargements 52 at their rearward ends to engage over a pivot pin 53 mounted on the frame and at their forward ends are formed with recessed extensions 54, 55 respectively, receiving coiled spring members 56, 57 engaged about a spring abutment bar 58 passing through apertures 61, 62, respectively, in the brake members 48, 49. The ends of the bar are screw threaded to receive nuts 63, against the inner ends of which washers 64 are provided which serve as spring abutments. Thus, by adjusting the nuts 63, the desired tension may be placed upon the clamping band or brake member 46.

The main shaft 12 is formed with a reduced section 65 adapted to receive a tapered roller race 66 upon which tapered roller bearings 67 are positioned, said bearings contacting a tapered surface 68 formed on an extension hub portion 69 on the plate 38. An annular clutch member 71 formed with teeth on the side opposite the hub member is secured by suitable fastening members 72 to the outer end of the hub. The outer end of the shaft 12 is formed with a reduced portion 73 externally threaded to receive a washer 74 and a threaded collar 75 which serve to hold the tapered roller race 66 in position on the shaft. The reduced portion of the shaft is also formed with a keyway 76 by means of which a clutch sleeve 77 having a series of longitudinally extending splines 78 on its outer surface is adapted to be held by means of a key 79. The clutch member 81 formed internally with suitable longitudinal grooves 82 to receive the splines is engaged over the clutch sleeve and is held in position by means of a retaining plate 83 held preferably by a castellated nut 84 having a locking cotter pin 85. The clutch member adjacent its outer end is provided with an annular recess 86 to receive the forks of a shifter yoke 87. The outer circumference of the clutch member 81 is formed with a cylindrical bearing surface 88 upon which is engaged a hub member 89 formed on the casing member 43. The outer portion of said hub member 89 is formed with a cyindrical bearing surface 91 engaging a bushing 92 mounted in an aperture 93 formed in the end frame extension 94.

The end frame extension 94 is preferably shaped to partially enclose the adjacent rotating parts, and is secured by suitable fastening members to the end frame member 3.

The drive gear 36, as has been explained, is actuated by the movement of the eccentric 29 on the crank shaft 12. The hub of the drive gear is preferably tapered to engage roller bearings 95 upon the race 32 engaged over the eccentric and provides a thrust bearing toward the plate 38.

Recesses are provided in the adjacent faces of the drive gear 36 and plate 38 to receive bearing members which while permitting eccentric movement of the drive gear under one phase of operation of the device, will prevent its rotation relatively to the casing member 43 and its associated parts. These bearing members are preferably large ball bearings 96 engaged in recesses 97, 98, formed respectively in the drive gear 36 and plate 38. The recesses in one member are offset from those in the other member and all the recesses are larger than the balls, so that the balls have rolling action in the respective recesses but are confined to restricted progressing areas thereof through the eccentric movement of the recesses in one member relatively to their companion recesses in the other member.

Through the non-rotation of the drive gear with its smaller number of teeth and the engagement progressively of such teeth with the teeth of the internal gear, the latter will be driven as well as the drum 10 to which it is firmly secured. By selection of suitable gears, variations in gear ratio may be provided for. As stated, such action takes place under certain conditions of operation.

The control of the brake member or clamping band 46 simultaneously with the clutch member 81 is brought about through the action of a pair of cam members 101, 102, carried by a control shaft 103 mounted in a bearing 104 on an upstanding frame member and having an operating handle 105 secured to its outer end by means of a key and keyway 106, 107, or other suitable fastening means. The cam 101 is a double cam adapted to fit between the extensions 54, 55 on the respective brake members and spread the same apart to releasing position against the tension of the springs 56, 57, heretofore described.

The spreading action will take place when the control shaft 103 is rotated in a clockwise direction, and the clamping action of the brake or clamping band will be rendered effective when the control shaft is turned in a counter-clockwise direction to the position shown more particularly in Figure 6 of the drawings. The cam 102 is larger than the double cams 101 heretofore described, and is positioned outwardly thereof on the control shaft 103. It is so set as to be effective to throw out the clutch when the brake or clamping band is engaged with the casing and to allow the spring 111 to engage the clutch when the brake band or clamping member is released.

The cam 102 when in operative position to release the clutch, as is shown in Figure 6, bears against the clutch release pin 108 slidingly engaged in the end frame extension 94 and secured to the free end of the clutch shifter yoke 87. A surrounding housing 109 is provided to receive a coil spring 111 which bears against an abutment 112 adjacent the head of the clutch release pin. When the cam is moved through an angle of 90°, the spring 111 will move the shifter yoke in a clutch engaging direction, and the cam 102 when brought into contact with the pin 108 will move the clutch in the opposite or releasing direction.

The rotation of the control shaft 103 by means of the handle 105 thus provides for two different speeds of operation of the winch, the drum rotating at shaft speed when the clutch is engaged and rotating at a lower rate of speed dependent on the particular gear ratio selected when the clutch is out of engagement and the brake or clamping band is applied to the casing.

When the device is hand operated, the drum may be operated at four speeds as provision is made for applying the crank to the shaft of the motor drive or to a stub shaft in line with the main shaft, as will be presently described. The mechanism at the power or driving end of the shaft will now be set forth.

The end of the main shaft 12 is formed with a reduced section 121 provided with a keyway 122 serving to secure to the shaft by means of a key an externally threaded hub 123 with which the internally threaded hub 124 of the drive gear 125 is engaged. A floating ratchet plate 126 is rotatably engaged upon an extension sleeve 127 of the hub 124 and is provided with ratchet teeth 128 on its outer circumference adapted to be engaged by a pawl 129 pivotally supported upon a pin 131 engaged in a socket 132 in the end frame member 2.

The ratchet plate is provided with a friction member 133 of annular shape engaging a disk 134 seated against the shoulder on the shaft and keyed to the reduced section of the shaft inwardly of the hub 124. A liner of friction material 135 is also provided intermediate the opposite side of the ratchet plate and the adjacent face of the drive gear 125. On the outer face of the hub of the drive gear a beveled surface is formed to provide a shoulder 136 which is adapted to be engaged by an oppositely directed shoulder 137 on a disk 138 keyed to the shaft. A castellated nut 139 secured by a cotter pin 141 holds the mechanism just described in secure engagement with the shaft.

In order to provide for operation of the mechanism independently of the drive gear, a stub shaft 142 is provided in direct alinement with the main shaft, said stub shaft being supported upon a plate 143 formed with a series of arms 144 each of which is apertured to receive securing bolts 145 engaged in screw-threaded apertures in the drive wheel 125.

The stub shaft 142 is adapted to be engaged by a crank handle 146, as has been indicated in Figure 1, and such hand crank is likewise adapted to be engaged upon a shaft 147 which is suitably journalled in the frame and carries a drive pinion 148 engaged with the teeth of the drive gear. The drive through the shaft 147 may be by means of an electric motor or through connection with an internal combustion engine or the like. When so used with an internal combustion engine a suitable transmission apparatus is preferably embodied in the drive so as to provide for various speeds and also a reverse gear.

The operation of the device has been indicated in the description of its construction, but it might be stated that when the drive is through the pinion, two speeds are provided for through the shifting of the clutch 81 and the brake or clamping band 46 heretofore described, and that when the drive is through the stub shaft 142, two additional speeds are provided for. In each instance when the main shaft is rotated in a driving direction, the disk 138 is rotated and sets the drive wheel in motion upon the externally threaded hub, causing the friction surface to come in contact with the ratchet plate and the disk 134 rotating the main shaft which drives the drum through the mechanism heretofore described directly when the clutch member 81 is in engagement and through the planetary gearing when the clutch 81 is disengaged and the clamping band 46 is engaged. The ratchet plate 126 serves to release the drive wheel from the shaft when the drive wheel is rotated in reverse direction, but prevents the accidental reverse movement of the mechanism until the drive gear is moved reversely.

The term planetary gearing is used in the broadest sense as covering such general type of mechanism and while helicoidal gearing has been shown and is the preferred specific form of apparatus, other forms of planetary gearing may be used in whole or in part to bring about certain of the effects herein set forth.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. An apparatus of the character described having in combination, a frame, a drum rotatably supported in said frame, an internal gear member associated with said drum for rotation therewith, a drive shaft concentric with said drum, an external gear member supported on an eccentric on said drive shaft and housed within said internal gear member, a plate provided with a marginal portion forming a flanged shell engaging over said internal and external gear members, means to impart relative motion between said shell and said external gear, means for clamping said shell against motion with said gear members, means for engaging said shell for rotation with said shaft and said gear members as a unit, and means for simultaneously moving said shell-clamping and shaft-engaging means respectively into operative position for one of said elements and inoperative position for the other element.

2. An apparatus of the character described having in combination, a frame, a drum rotatably supported in said frame, an internal gear member associated with said drum for rotation therewith, a drive shaft concentric with said drum, an external gear member supported on an eccentric on said drive shaft and housed within said internal gear member, a plate provided with a marginal portion forming a flanged shell engaging over said internal and external gear members, recesses formed in adjacent faces of said shell and external gear member, said recesses being eccentrically related to each other, and ball bearing members engaged within said companion recesses in said shell and external gear member, means for clamping said shell against motion with said gear members, and means for engaging said shell for rotation with said shaft and said gear members as a unit.

3. An apparatus of the character described having in combination, a frame, a drum rotatably supported in said frame, a gear housing rotatably supported adjacent said drum, a shaft extending centrally through said drum and gear housing, means at one end of said shaft for driving the same, means for automatically engaging said driving means with said shaft upon motion in one direction and for holding said shaft against rotation relative to said driving means when said driving means is stopped and for releasing said shaft from said driving means when said driving means is moved in reverse direction, planetary driving means within said housing, a clamping member supported externally of said housing for causing said planetary driving means to rotate said drum at low speed ratio when engaged with said housing, a clutch member to rotate said drum at shaft speed when engaged with companion parts associated with said housing, a spring member for moving said clutch into engaged position with said housing, and a pair of cam members adapted respectively to shift said clutch into disengaged position and to actuate said clamping member to engaging position when moved in one direction and to free said clutch for engagement through its spring member and to release said clamping engagement upon said housing when moved in the opposite direction.

4. An apparatus of the character described having in combination, a drum and a variable drive mechanism therefor, a clutch and clamping band for changing the speed ratios of said drive mechanism, springs for moving said clutch and clamping band respectively into engaging position, and cam means for releasing said spring and clamping band from engaging position.

5. An apparatus of the character described having in combination, a drum and a variable drive mechanism therefor, a clutch and clamping band for changing the speed ratios of said drive mechanism, springs for moving said clutch and clamping band respectively into engaging position, cam means for releasing said spring and clamping band from engaging position, and cam-actuating means for alternately moving said cams to releasing position for said clutch and clamping band respectively.

6. An apparatus of the character described having in combination, a frame comprising end members in the form of plates and spacing and supporting members in the form of bars adjustably secured to said plates, a drum provided with flanges to receive a hoisting cable, said drum being formed in two sections adapted to be telescopically engaged and fastened in rigid relation to each other and thereafter to be assembled with said frame member, a frame extension secured to one of said end frame members, and a gear housing supported intermediate said frame extension and end frame member for enclosing the change speed mechanism of said apparatus.

CHARLES C. MARTIN.